(12) United States Patent
Sakamoto

(10) Patent No.: US 10,277,902 B2
(45) Date of Patent: Apr. 30, 2019

(54) IMAGE ENCODING APPARATUS AND CONTROL METHOD THEREOF

(71) Applicant: CANON KABUSHIKI KAISHA, Tokyo (JP)

(72) Inventor: Daisuke Sakamoto, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 77 days.

(21) Appl. No.: 15/662,564

(22) Filed: Jul. 28, 2017

(65) Prior Publication Data

US 2018/0054614 A1 Feb. 22, 2018

(30) Foreign Application Priority Data

Aug. 22, 2016 (JP) ................................. 2016-162206

(51) Int. Cl.

| H04N 7/12 | (2006.01) |
|---|---|
| H04N 11/02 | (2006.01) |
| H04N 11/04 | (2006.01) |
| H04N 19/139 | (2014.01) |
| H04N 19/107 | (2014.01) |
| H04N 19/124 | (2014.01) |
| H04N 19/172 | (2014.01) |
| H04N 19/174 | (2014.01) |
| H04N 19/186 | (2014.01) |
| H04N 19/52 | (2014.01) |
| H04N 19/51 | (2014.01) |

(52) U.S. Cl.
CPC ......... *H04N 19/139* (2014.11); *H04N 19/107* (2014.11); *H04N 19/124* (2014.11); *H04N 19/172* (2014.11); *H04N 19/174* (2014.11); *H04N 19/186* (2014.11); *H04N 19/51* (2014.11); *H04N 19/52* (2014.11)

(58) Field of Classification Search
CPC ...... H04N 19/139; H04N 19/51; H04N 19/52; H04N 19/186; H04N 19/107; H04N 19/172; H04N 19/124; H04N 19/174
See application file for complete search history.

(56) References Cited

U.S. PATENT DOCUMENTS

| 8,363,717 B2 | 1/2013 | Togita et al. | |
|---|---|---|---|
| 2005/0276328 A1 | 12/2005 | Sakamoto | |
| 2007/0171490 A1* | 7/2007 | Cho | .................. H04N 9/64 358/539 |

(Continued)

FOREIGN PATENT DOCUMENTS

| JP | 2011-041144 A | 2/2011 |
|---|---|---|
| JP | 2014-017647 A | 1/2014 |

*Primary Examiner* — Jared Walker
(74) *Attorney, Agent, or Firm* — Venable LLP

(57) ABSTRACT

The present invention has a converting unit that converts image data in a Bayer array into three planes consisting of G, B and R planes that have the same array relationship as YCC 422, and an encoding unit that performs prediction encoding of the G, B and R planes obtained by the converting unit as YCC 422 image data. Here, the number of pixels in the horizontal direction of the G plane is twice the number of pixels in the horizontal direction of the B or R plane. Also, the encoding unit includes a motion searching unit that obtains a motion vector of a pixel block to be encoded as a motion vector of the G plane, and a correcting unit that corrects a motion vector of the B and R planes based on the motion vector for the G plane.

10 Claims, 8 Drawing Sheets

(56) References Cited

U.S. PATENT DOCUMENTS

| | | | |
|---|---|---|---|
| 2008/0008238 A1* | 1/2008 | Song | H04N 19/105 375/240.11 |
| 2013/0177074 A1 | 7/2013 | Togita et al. | |
| 2014/0098268 A1* | 4/2014 | Mochizuki | H04N 9/045 348/277 |
| 2015/0201209 A1 | 7/2015 | Sakamoto | |
| 2017/0118476 A1 | 4/2017 | Sakamoto | |
| 2017/0118492 A1 | 4/2017 | Sakamoto | |

* cited by examiner

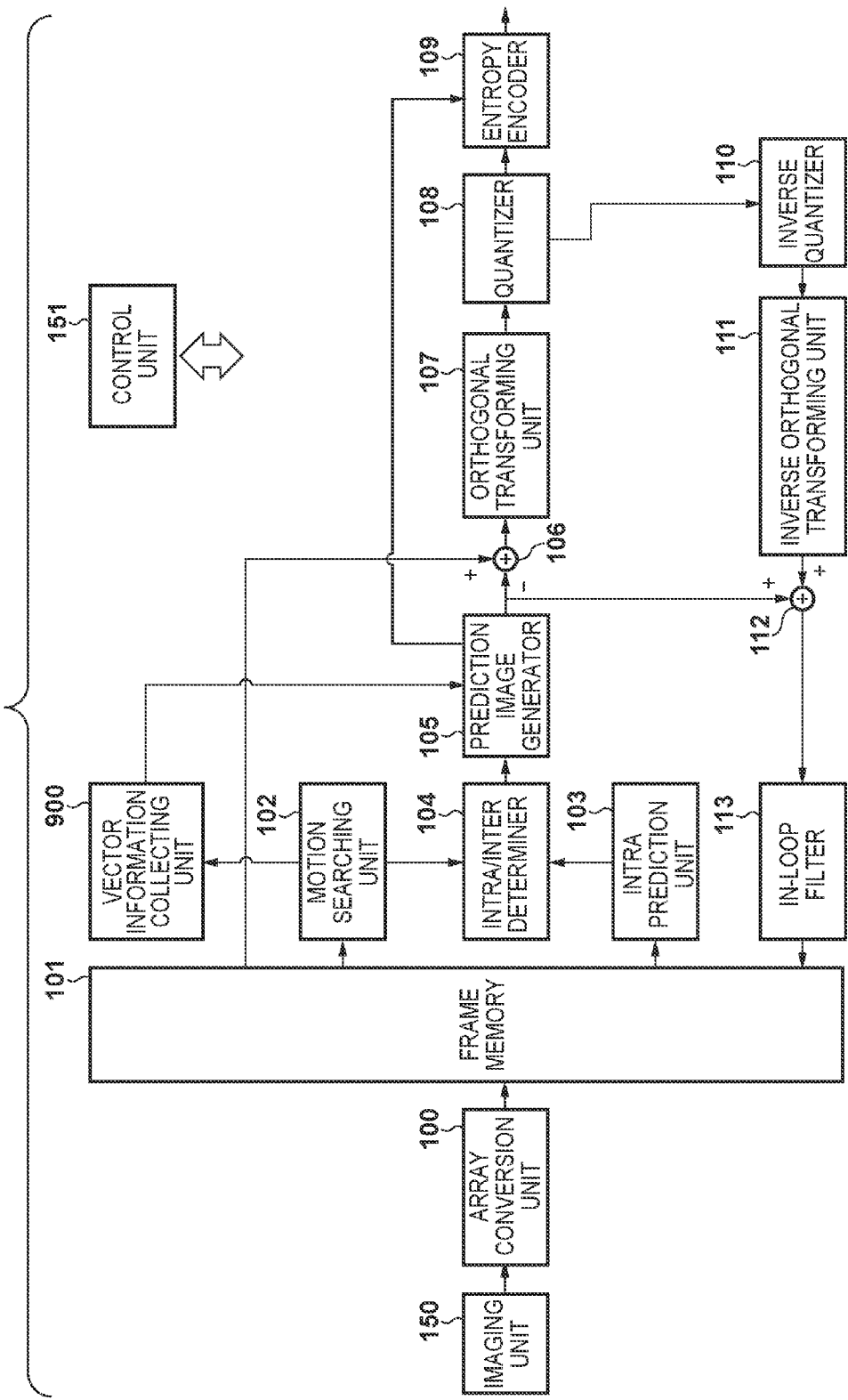

IMAGE ENCODING APPARATUS AND CONTROL METHOD THEREOF

BACKGROUND OF THE INVENTION

Field of the Invention

The present invention relates to a technique for encoding a moving image.

Description of the Related Art

In image capturing apparatuses such as digital cameras and digital camcorders, a CCD sensor or a CMOS sensor is adopted as an image sensor. In addition, a color filter array (hereinafter, referred to as a CFA) is provided on the surface of the sensor, and one color component is detected for one pixel. By using the CFA, image data (hereinafter, referred to as RAW image data) in a Bayer array in which R (red), G0 (green), B (blue) and G1 (green) are arranged in a cyclic pattern as shown in FIG. 2 is obtained. Due to human visual properties having a high sensitivity to luminance components, in a general Bayer array, a configuration is used in which the allocated number of pixels of a green component that includes a large amount of luminance components is twice the number of pixels of a red component and the number of pixels of a blue component as shown in FIG. 2. The RAW image data has information of only one color component per pixel. Therefore, processing for generating information of red, blue and green for one pixel is performed using processing called demosaicing. In addition, generally, image data of RGB signals obtained by performing demosaicing or YUV signals obtained by converting RGB signals is encoded, and recorded in a recording medium such as a memory card. However, image data obtained by demosaicing has three color components per pixel, and requires a data amount three times the data amount of RAW image data. Therefore, a method for directly encoding and recording RAW image data before demosaicing has been proposed.

For example, in Japanese Patent Laid-Open No. 2011-41144, a method for performing encoding after separating RAW image data into four planes, namely, R, G0 , B and G1 planes, is described. When recording a moving image, the data amount is very large, and thus there is demand for more efficiently compressing and encoding data. In view of this, a method for efficiently performing encoding using motion-compensated prediction encoding is described in Japanese Patent Laid-Open No. 2014-17647.

In the method described in Japanese Patent Laid-Open No. 2014-17647, the G component is divided into two types of frames, namely, G0 and G1 frames, and motion-compensated prediction is then performed. Therefore, the number of G frames is twice the number of R frames and the number of B frames, and the processing amount of the G frames is twice the processing amount of the R frames and the processing amount of the B frames. In addition, the G0 frame and the G1 frame are sometimes image data of the same time and sometimes not, and it is necessary to newly establish a method for decoding the G frames and the R and B frames at different timings when performing decoding with a conventional decoding apparatus that uses an encoding scheme such as MPEG, H.264 or HEVC.

Encoding by a conventional encoding apparatus that uses an encoding scheme such as MPEG, H.264 or HEVC is performed with the luminance/color difference set to 4:2:2 (referred to as a YCC 422 array).

The present inventors focused on the fact that the number of pixels in the horizontal direction in a case where G0 and G1 are arranged side-by-side in RAW image data in a Bayer array is, as shown in FIG. 3, twice the number of R pixels and the number of B pixels, and thought of a method of inputting image data with the pixels of the image data arranged in a YCC 422 array by considering G0 and G1 as Y, R as Cr, and B as Cb. The image data is in the equivalent of an YCC 422 array, and thus the numbers of R, B and G frames are the same, enabling control similar to conventional encoding and decoding apparatuses.

Here, a case is considered in which the horizontal component of a motion vector of the Y (G) component is an odd number with integer precision, and as in FIG. 4, G0 and G1 refer to each other (in FIG. 4, the coordinates of the motion vector are (−1,0)). When this motion vector is returned to a Bayer array, G0 and G1 are aligned in an oblique direction, and thus G0 will refer to G1 in the lower left direction, and G1 will refer to G0 in the upper left direction. Therefore, when this concept is applied to the R and B components, it is not clearly determined whether to refer to the pixel in the upper left direction, the lower left direction, or the vertical direction.

Therefore, assume that, with the motion vectors of R and B, the horizontal component is half that of G, and the vertical component is the same as that of G. In this case, if the pixel in the lower left direction needed to be referred to or the pixel in the upper left direction needed to be referred to with the R and B components, the image that needed to be referred to with the G component cannot be referred to, and the encoding efficiency deteriorates.

SUMMARY OF THE INVENTION

The present invention has been made in light of the above-described problem, and aims to provide a technique for further improving the encoding efficiency of RAW image data in a Bayer array.

According to an aspect of the invention, there is provided an image encoding apparatus that encodes moving image data in which each frame is constituted by image data in a Bayer array, comprising: a converting unit configured to convert image data in a Bayer array into three planes consisting of a G plane, a B plane and an R plane, the number of pixels in a horizontal direction of the G plane being twice the number of pixels in the horizontal direction of the B plane or R plane; and an encoding unit configured to perform prediction encoding, for each pixel block, with the G plane, B plane and R plane obtained by the converting unit as YCC 422 image data, wherein the encoding unit includes: a motion searching unit configured to obtain a motion vector of the pixel block to be encoded, as a motion vector of the G plane; and a correcting unit configured to correct a motion vector of the B and R planes based on the motion vector obtained by the motion searching unit.

According to the present invention, it is possible to improve the encoding efficiency of RAW image data in a Bayer array.

Further features of the present invention will become apparent from the following description of exemplary embodiments (with reference to the attached drawings).

BRIEF DESCRIPTION OF THE DRAWINGS

FIG. 9 is a block diagram showing the configuration of an image encoding apparatus according to a second embodiment.

DESCRIPTION OF THE EMBODIMENTS

Embodiments according to the present invention will be described in detail below with reference to the attached drawings.

First Embodiment

Figure 1:
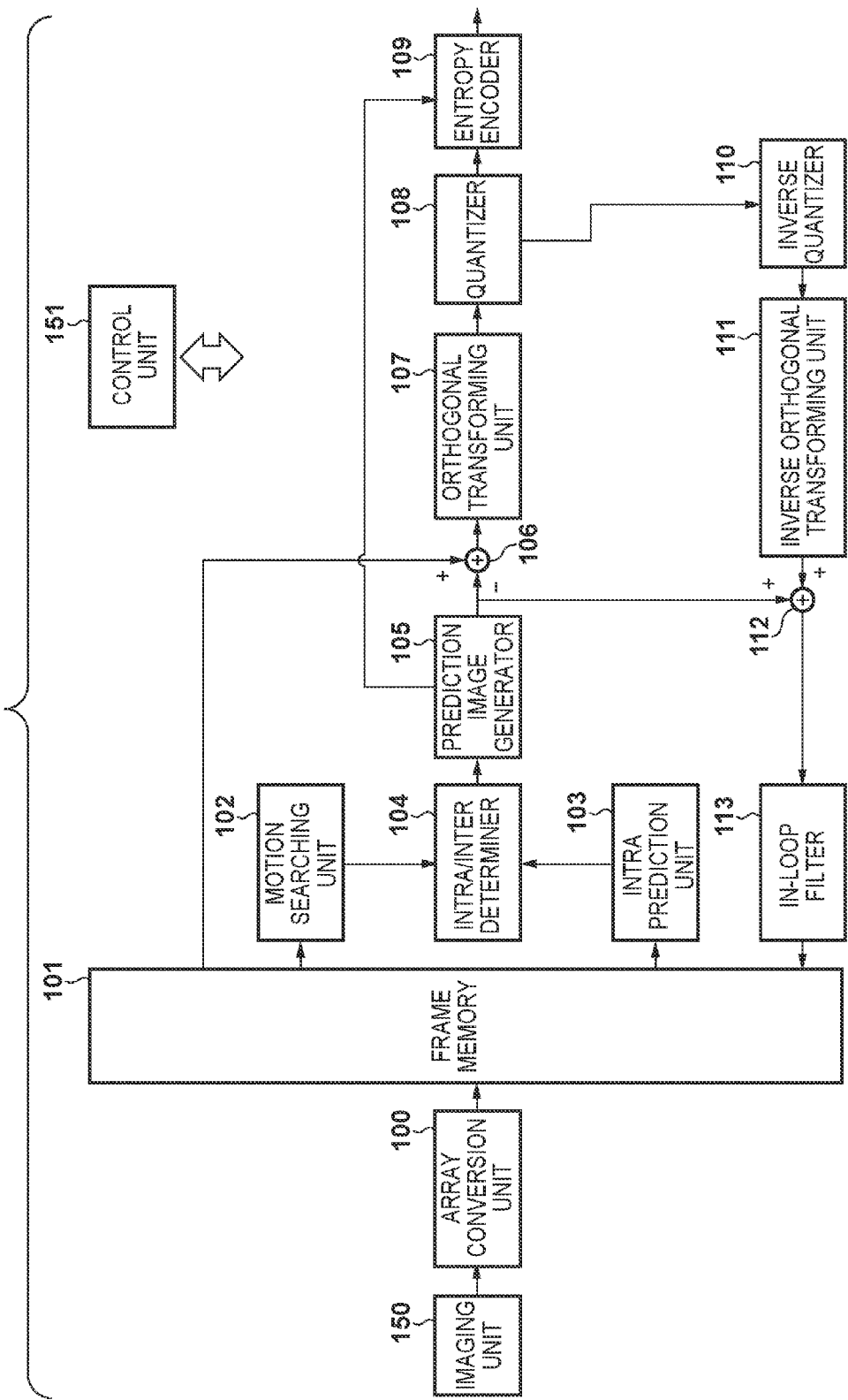
FIG. 1 is a block diagram showing the configuration of an image encoding apparatus according to a first embodiment.

FIG. 1 is a block diagram showing the configuration of a moving image data encoding apparatus according to this embodiment. This apparatus is provided in an image capturing apparatus that has an image sensor such as a video camera. However, an apparatus such as a mobile terminal (e.g., smartphone) that has a function for capturing a moving image may be adopted. It should be understood that embodiment is merely to facilitate understanding of the technical contents.

The moving image encoding apparatus is provided with a control unit 151, an imaging unit 150, an array conversion unit 100, a frame memory 101, a motion searching unit 102, an intra prediction unit 103, an intra/inter determiner 104, a prediction image generator 105, a subtractor 106, an orthogonal transforming unit 107, a quantizer 108, an entropy encoder 109, an inverse quantizer 110, an inverse orthogonal transforming unit 111, an adder 112 and an in-loop filter 113. The control unit 151 is constituted by a CPU, a ROM, a RAM and the like, and performs overall control of the apparatus. Note that, in this embodiment, a configuration that is based on H.264 is illustrated, but any method that uses motion-compensated prediction encoding may be adopted, and there is no limitation to this.

Encoding processing in this apparatus will be described below with reference to FIG. 1.

Figure 2:
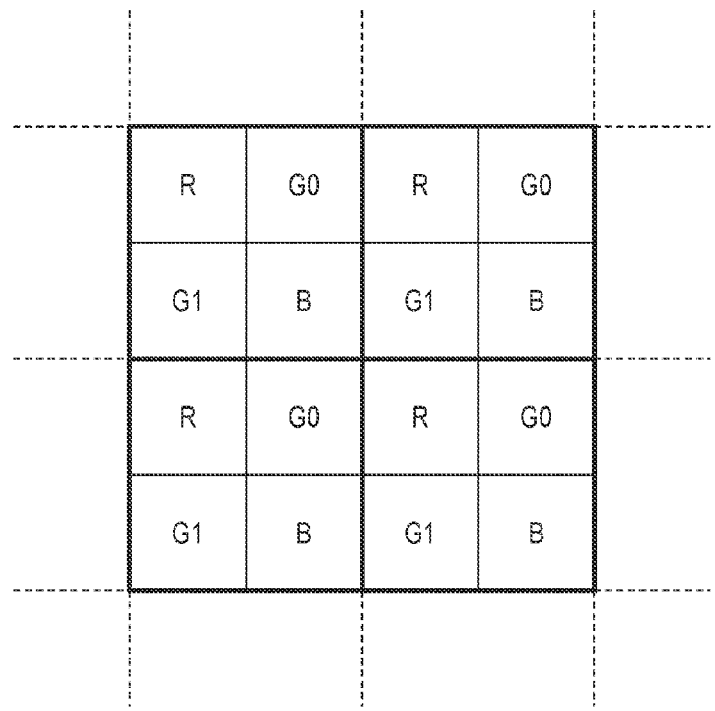
FIG. 2 is a diagram showing a Bayer array.
Figure 3:
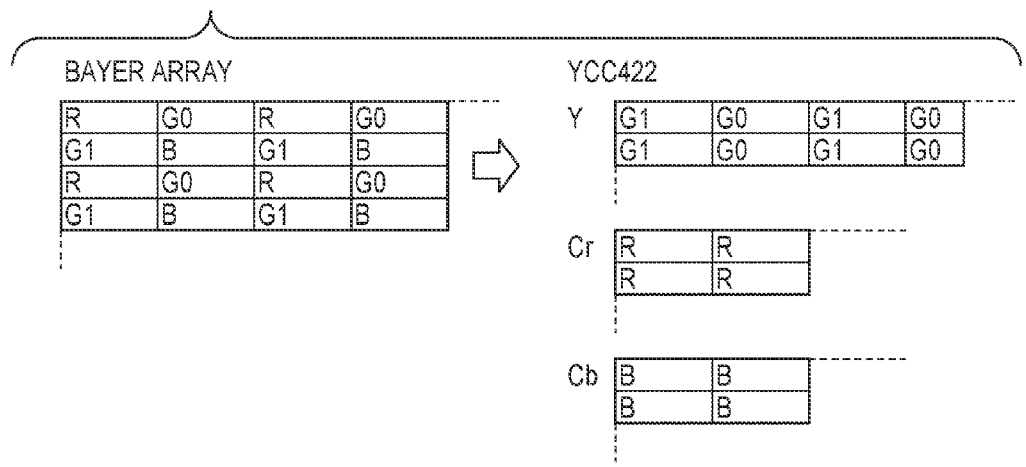
FIG. 3 is a diagram for describing reconfiguration from a Bayer array to a YCC 422 array.

The array conversion unit 100 receives input of RAW image data in a Bayer array (see FIG. 2) from the imaging unit 150 that accommodates an image sensor, an A/D converter and the like. The array conversion unit 100 then generates three types of planes, namely, R planes, B planes and G (G0 and G1) planes from the RAW image data that has been input, and stores those planes to the frame memory 101. Here, letting the number of pixels in the horizontal direction of the RAW image data be W, and the number of pixels in the vertical direction be H, an R plane and a B plane are each constituted by W/2×H/2 pixels. On the other hand, the number of pixels in the vertical direction of a G plane is the same as each of the number of pixels in the vertical direction of the R plane and the number of pixels in the vertical direction of the B plane, but the number of pixels in the horizontal direction of the G plane is twice (each of the number of pixels in the horizontal direction of the R plane and the number of pixels in the horizontal direction of the B plane), and the G plane is constituted by W×H/2 pixels. Accordingly, the array relationship between the G plane, R plane and B plane is the same as a YCC 422 array, and it can be said that the array conversion unit 100 performs reconfiguration processing from a Bayer array into a YCC 422 array.

When encoding each plane stored in the frame memory 101, the motion searching unit 102 reads out image data of a macroblock to be encoded, from the region of an input image. In addition, image data of a predetermined search window is read out from the region of reference image data, and motion search is performed. Note that a plurality of methods are conceivable regarding position setting of the search window, and, for example, the position of the search window is set centered on the macroblock to be encoded, or is set centered on the position indicated by a motion vector obtained in an immediately preceding macroblock, but there is no restriction on the method.

As a specific procedure of motion search, first, block matching is performed between G image data within the search window and G image data of the macroblock to be encoded is performed, and a position at which the correlation is high is determined as a motion vector, and the intra/inter determiner 104 is notified of the motion vector.

Note that in order to determine a motion vector using block matching, evaluation functions of an MSE (Mean Square Error), an MAE (Mean Absolute Error) and the like as the following expressions are used. In some cases, an MAD (Mean Absolute Difference) may be adopted.

$$MSE = \sum_{x=0}^{16}\sum_{y=0}^{16}[S_{cur,k}(x,y) - S_{ref}(x+i, y+j)]^2$$

$$MAE = \sum_{x=0}^{16}\sum_{y=0}^{16}|S_{cur,k}(x,y) - S_{ref}(x+i, y+j)|(-X \le i \le X, -Y \le j \le Y)$$

Here, $S_{ref}$ indicates a reference image, and $S_{cur,k}$ indicates a k-th macroblock within the image to be encoded. Also, (x,y) are the coordinates of a pixel in a macroblock of the size of 16×16. (i,j) indicate the spatial position of a reference frame/field relative to the k-th macroblock of the current frame. In addition, assuming that X and Y respectively indicate the number of horizontal pixels and the number of vertical pixels of the search window, the range of (i,j) is expressed as $-X \le i \le X, -Y \le j \le Y$. This evaluation function is based on the pixel difference, and (i,j) at which the MAE value and MSE value are smallest is regarded as a position at which the correlation is high, and is determined as the final motion vector in the macroblock to be encoded. Note that, in this embodiment, a motion vector is determined using a MAE value. Note that, in the embodiments, the horizontal right direction indicates the positive direction of x coordinates, and the vertical downward direction indicates the positive direction of y coordinates. Accordingly, the coordinates of the upper left corner of an image are assumed to be the origin (0,0).

The motion searching unit 102 searches for a prediction block for an encoding target macroblock of a G plane, from a reference G plane, and notifies the intra/inter determiner 104 of the MAE value of the image data of the block to be encoded and the image data of the prediction block. Subsequently, the motion searching unit 102 also determines a motion vector of R and B planes, but the detailed procedure will be described later.

The intra prediction unit 103 reads out the image data of the block to be encoded, from the region of an input image in the frame memory 101. The intra prediction unit 103 then selects an intra prediction method based on the correlation with a plurality of pieces of intra prediction image data generated from pixel data in the periphery of the encoding target block that has been encoded already, and notifies the intra/inter determiner 104 of the selected intra prediction method. The intra prediction unit 103 also notifies the intra/inter determiner 104 of the MAE value of the pixels of the prediction image and the macroblock to be encoded, the MAE value having been obtained using the selected intra prediction method.

The intra/inter determiner 104 receives input of the MAE value from the motion searching unit 102 and the MAE value from the intra prediction unit 103, selects a prediction method of the smaller of the input MAEs, and notifies the prediction image generator 105 of the selected prediction method.

If the prediction method selected by the intra/inter determiner 104 is intra prediction, the prediction image generator 105 generates a prediction image in accordance with the selected an intra prediction mode. Also, if the selected prediction method is inter prediction, the prediction image generator 105 generates a prediction image in accordance with the motion vector and c_v_vec_align to be described later, and outputs the prediction image to the subtractor 106. The prediction image generator 105 also transmits the selected motion vector or intra prediction mode to the entropy encoder 109.

The subtractor 106 calculates the difference between the macroblock to be encoded and a block of the prediction image, and generates difference block data. The difference block data is output to the orthogonal transforming unit 107, which performs orthogonal transformation on the difference block data that has been input. The quantizer 108 performs quantization processing on signals that have undergone orthogonal transformation performed by the orthogonal transforming unit 107. The entropy encoder 109 performs entropy encoding such as CAVLC or CABAC on a transformation coefficient quantized by the quantizer 108, and outputs the transformation coefficient as encoded data. At this time, the entropy encoder 109 also outputs, as encoded data, the selected motion vector or intra prediction mode notified by the prediction image generator 105.

The quantizer 108 supplies the quantized transformation coefficient to the inverse quantizer 110 as well. The inverse quantizer 110 performs inverse quantization on the transformation coefficient that has been input, and supplies the transformation coefficient that underwent inverse quantization to the inverse orthogonal transforming unit 111. The inverse orthogonal transforming unit 111 performs inverse orthogonal transformation processing on the signals of the transformation coefficient that underwent inverse quantization, and supplies the signals to the adder 112.

The data that underwent inverse orthogonal transformation and the prediction image data generated by the prediction image generator 105 are input to the adder 112 and are added together by the adder 112. The added data is reconfigured image data that has been decoded, and is then input to the aforementioned intra prediction unit 103 and prediction image generator 105 and used for generating intra prediction image data. The reconfigured image data is also subjected to processing for reducing coding distortion performed by the in-loop filter 113, and is stored as reference image data that is used at the time of inter encoding, to the region of the reference image of the frame memory 101.

Figure 5A:
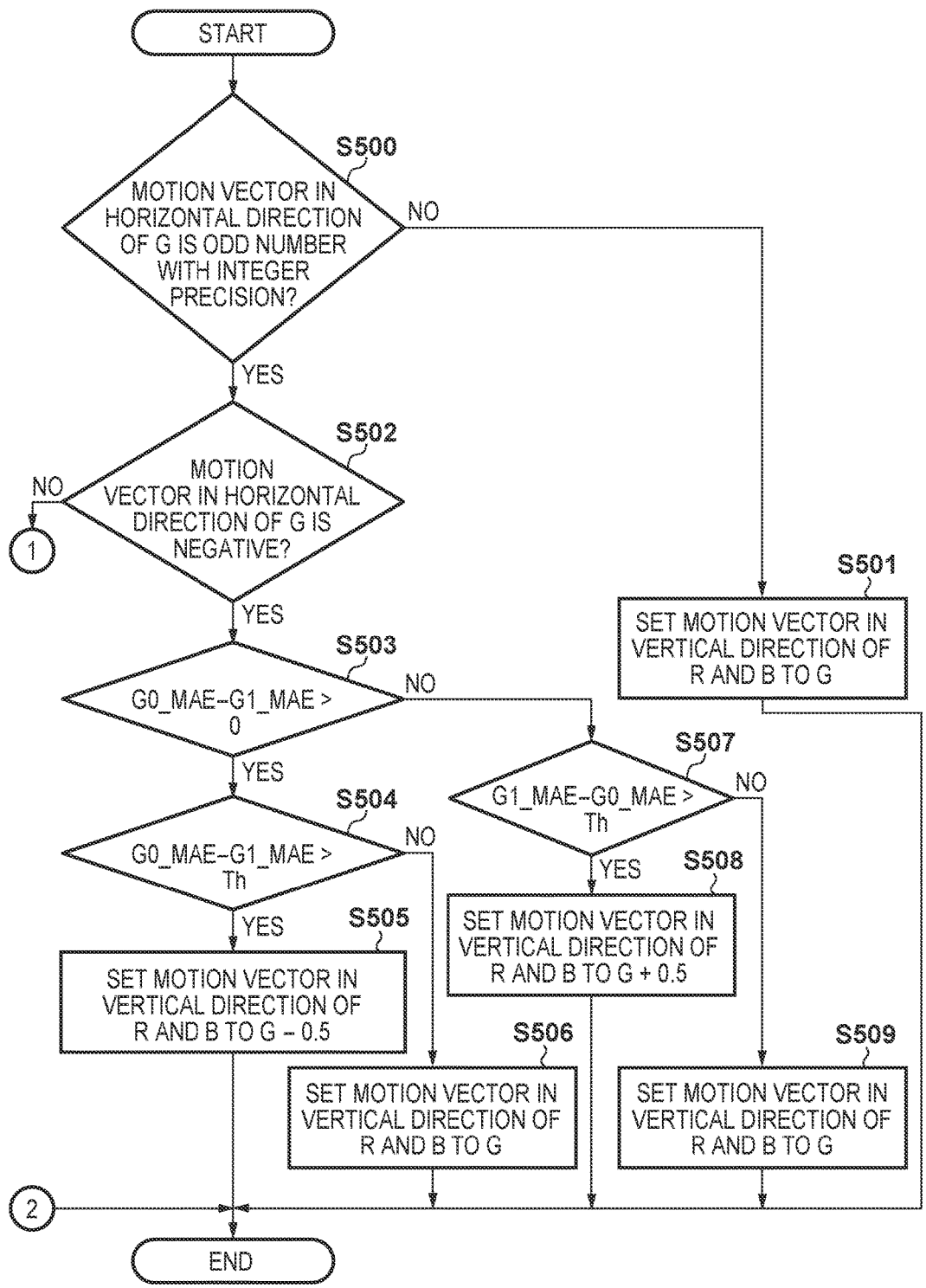
FIGS. 5A and 5B are flowcharts showing a procedure for determining the vertical component of motion vector of R and B planes in the first embodiment.
Figure 5B:
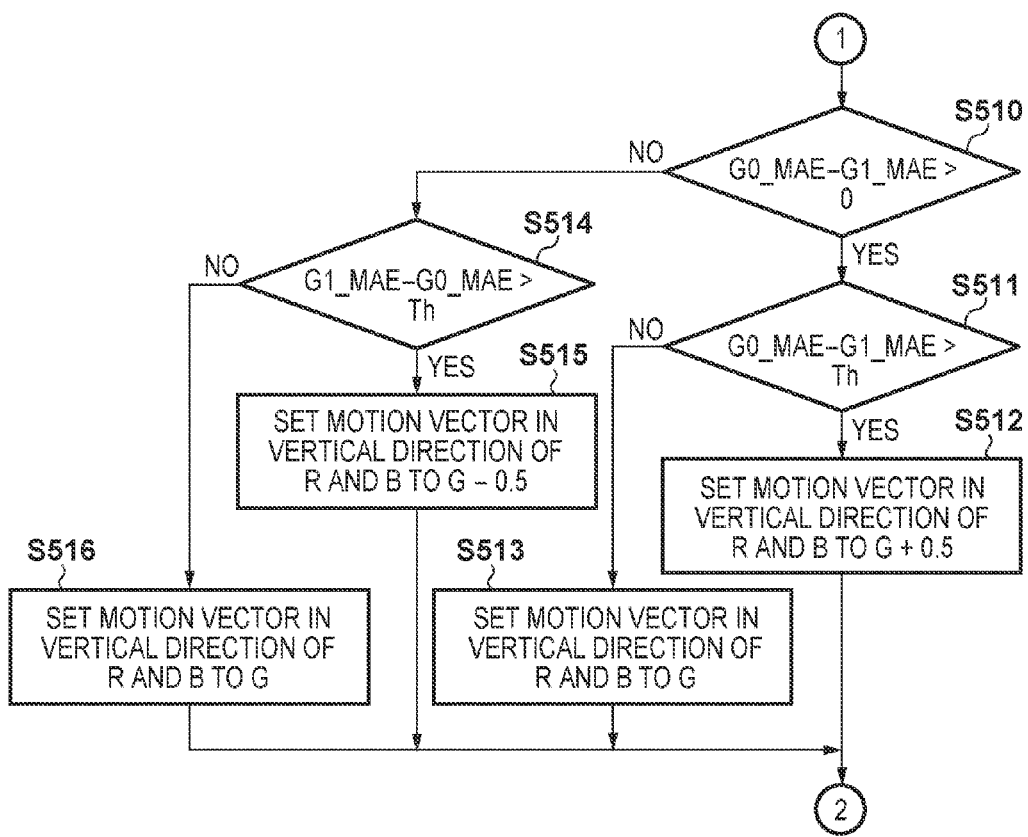

Subsequently, a method for determining the vertical component of a motion vector of the R and B planes performed by the motion searching unit 102, the method being a feature of this embodiment, will be described in detail with reference to the flowcharts in FIGS. 5A and 5B. Note that the horizontal component of a motion vector of the R and B planes is fixed and is half that of the G plane. Also, c_v_vec_align that is used in the description is a parameter indicating a correction value for correcting the vertical component of the motion vector of the R and B planes relative to the vertical component of the motion vector of the G plane, and has the following meanings.

The case where c_v_vec align=0 indicates that the vertical component of the motion vector of the R and B planes is the same as the vertical component of the motion vector of the G plane.

The case where c_v_vec align=1 indicates that the vertical component of the motion vector of the R and B planes is less than the vertical component of the motion vector of the G plane data by −0.5.

The case where c_v_vec align=2 indicates that the vertical component of the motion vector of the R and B planes is greater than the vertical component of the motion vector of the G plane data by 0.5.

In addition, the MAE of an image represented by pixels G0 within the macroblock of interest in the G plane and an image represented by pixels G1 within a reference block indicated by a motion vector is denoted by G0_MAE. Also, the MAE of an image represented by pixels G1 within the macroblock of interest in the G plane and an image represented by pixels G0 within the reference block indicated by the motion vector is denoted by G1_MAE. It is assumed that the above G0_MAE and G1_MAE are calculated by the motion searching unit 102 prior to the processing in FIGS. 5A and 5B.

After the motion vector of the macroblock of interest in the G plane is determined, the motion searching unit 102 determines whether or not the horizontal component of the motion vector is an odd number with integer precision, in other words, whether or not the motion vector is a motion vector in which the pixels G0 and the pixels G1 refer to each other (step S500).

Here, assume that the horizontal component of the motion vector of the macroblock of interest in the G plane is not an odd number with integer precision (a case of an even number). In this case, the motion searching unit 102 determines that the vertical component of the motion vector of the macroblock of interest of the R and B planes is the same as that of the G plane, and transmits the determination result as c_v_vec align=0 to the intra/inter determiner 104 (step S501).

On the other hand, if the horizontal component of the motion vector of the G plane is an odd number with integer precision, the motion searching unit 102 determines whether or not the horizontal component of the motion vector of the G plane is negative (step S502).

If the horizontal component of the motion vector of the G plane is negative, the motion searching unit 102 compares G0_MAE with G1_MAE (step S503). If G0_MAE is greater than G1_MAE , the motion searching unit 102 further determines whether or not G0_MAE−G1_MAE is greater than a threshold value Th (step S504). If G0_MAE−G1_MAE is greater than the threshold value Th, the motion searching unit 102 advances the procedure to step S505. In this step S505, the motion searching unit 102 determines that the vertical component of the motion vector of the R and B planes is less than the vertical component of the motion vector of the G plane by 0.5, and thus transmits the determination result as c_v_vec align=1 to the intra/inter determiner 104 (step S505).

On the other hand, if G0_MAE−G1_MAE is less than or equal to the threshold value Th, the motion searching unit 102 determines that the vertical component of the motion vector of the R and B planes is the same as that of the G plane, and transmits the determination result as c_v_vec align=0 to the intra/inter determiner 104 (step S506).

In addition, if G0_MAE is less than or equal to G1_MAE, the motion searching unit 102 determines whether or not G1_MAE−G0_MAE is greater than the threshold value Th (step S507). If G1_MAE−G0_MAE is greater than the threshold value Th, the motion searching unit 102 advances the procedure to step S508. In this step S508, the motion searching unit 102 determines that the vertical component of the motion vector of the R and B planes is greater than that of the G plane by 0.5, and thus transmits the determination result as c_v_vec align=2 to the intra/inter determiner 104 (step S508).

On the other hand, if G1_MAE−G0_is less than or equal to the threshold value Th, the motion searching unit 102 determines that the vertical component of the motion vector of the R and B planes is the same as that of the G plane, and transmits the determination result as c_v_vec align=0 to the intra/inter determiner 104 (step S509).

If it is determined in step S502 that the horizontal component of the motion vector of the G plane is non-negative (positive), the motion searching unit 102 advances the procedure to step S510. In this step S510, the motion searching unit 102 compares G0_MAE with G1_MAE.

If G0_MAE is greater than G1_MAE, the motion searching unit 102 further determines whether or not G0_MAE−G1_MAE is greater than the threshold value Th (step S511). If G0_MAE with G1_is greater than the threshold value Th, the motion searching unit 102 advances the procedure to step S512. In this step S512, the motion searching unit 102 determines that the vertical component of the motion vector of the R and B planes is greater than the vertical component of the motion vector of the G plane by 0.5, and thus transmits the determination result as c_v_vec align=2 to the intra/inter determiner 104 (step S512).

On the other hand, if G0_MAE with G1_MAE is less than or equal to the threshold value Th, the motion searching unit 102 determines that the vertical component of the motion vector of the R and B planes is the same as that of the G plane, and thus transmits the determination result as c_v_vec align=0 to the intra/inter determiner 104 (step S513).

Also, if G0_MAE is less than or equal to G1_MAE, the motion searching unit 102 determines whether or not G1_MAE−G0_MAE is greater than the threshold value Th (step S514). If G1_MAE−G0_MAE is greater than the threshold value Th, the motion searching unit 102 advances the procedure to step S515. In this step S515, the motion searching unit 102 determines that the vertical component of the motion vector of the R and B planes is less than that of the G plane by 0.5, and thus transmits the determination result as c_v_vec align=1 to the intra/inter determiner 104 (step S515).

On the other hand, if G1_MAE−G0_MAE is less than or equal to the threshold value Th, the motion searching unit 102 determines that the vertical component of the motion vector of the R and B planes is the same as that of the G plane, and thus transmits the determination result as c_v_vec align=0 to the intra/inter determiner 104 (step S516).

Here, the reason for determining the vertical component of the motion vector of the R and B planes (c_v_vec align) by the above procedure will be described.

Figure 4:
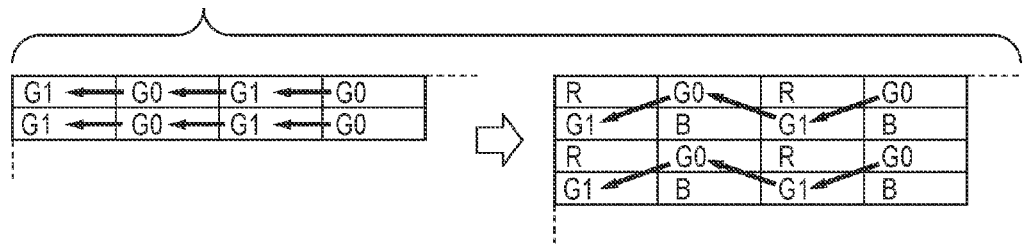
FIG. 4 is a diagram for describing positions indicated by motion vectors when the motion vectors obtained in a YCC 422 array are returned to a Bayer array.

If the horizontal component of the motion vector of the G plane is an odd number with integer precision and is negative, the pixels G0 within the macroblock to be encoded refer to the pixels G1 to the lower left within the reference block (prediction block) as in FIG. 4. Also, the pixels G1 within the macroblock to be encoded refer to the G0 to the upper left within the reference block.

The case where G0_MAE is less than G1_MAE regarding the macroblock to be encoded means that the pixels G0 were dominant as the motion vector of the macroblock to be encoded. Accordingly, it is indicated that the horizontal component of the motion vector is based on G0, and there is a high possibility that it is more appropriate to select a motion vector pointing to the lower left. Therefore, as the vertical component of the motion vector of the R and B planes, the vertical component of the G plane is corrected by +0.5 (downward direction). On the other hand, if G0_MAE is greater than G1_MAE, or in other words, if a motion vector is selected based on G1, it can be said that there is a high possibility that it is more appropriate to select a motion vector pointing to the upper left. Therefore, as the vertical component of the motion vector of the R and B planes, that of the G plane is corrected by −0.5 (upward direction). Also, if G0_MAE and G1_MAE are approximately the same, there is no bias to either the upper left or lower left, and thus it is presumed that the vertical component of the motion vector of the R and B planes is the same as that of the G plane.

If the horizontal component of the motion vector of the G plane is positive, the pixels G0 within the macroblock to be encoded refer to the pixels G1 positioned to the upper right within the reference block. Also, the pixels G1 within the macroblock to be encoded will refer to the pixels G0 positioned to the lower right within the reference block. G0_MAE being smaller than G1_MAE means that a motion vector is selected based on the pixels G0. Accordingly, it can be said that there is a high possibility that it is more appropriate to select a motion vector pointing to the upper right. Therefore, as the vertical component of the motion vector of the R and B planes, that of the G plane is corrected by −0.5 (upward direction). On the other hand, G0_MAE being greater than G1_MAE means that a motion vector is selected based on G1. Accordingly, there is a high possibility that it is more appropriate to select a motion vector pointing in the lower right direction. In view of this, as the vertical component of the motion vector of the R and B planes, that of G is corrected by +0.5 (downward direction). If G0_MAE and G1_MAE are approximately the same, there is no bias to either to the upper left or lower left, and thus the vertical component of the motion vector of the R and B planes is determined to be the same as that of the G plane.

As described above, regarding encoded data obtained by conventional encoding processing using H.264 or HEVC, it becomes possible to generate a more appropriate block as a prediction pixel block of the R and B planes by newly adding one parameter c_v_vec_align to motion vectors, and to improve the encoding efficiency.

Figure 6:
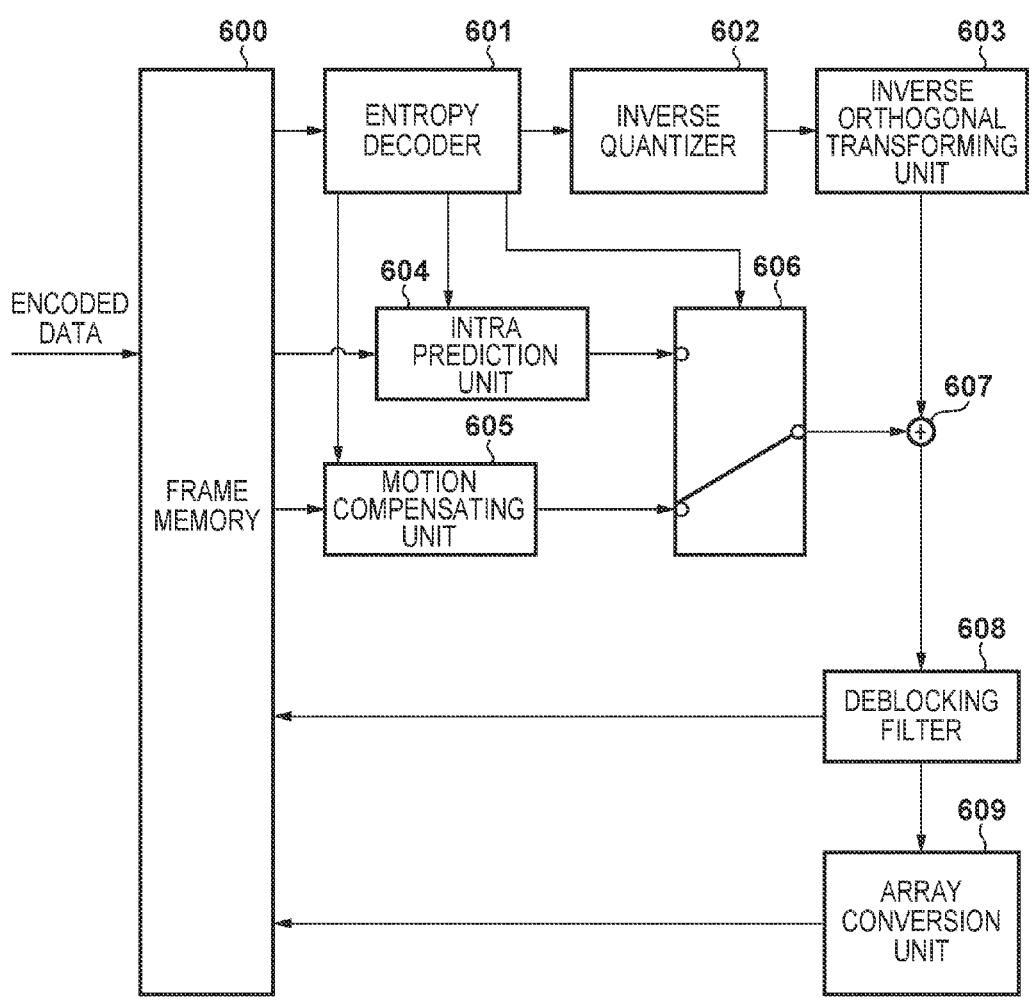
FIG. 6 is a block diagram showing the configuration of an image decoding apparatus according to the first embodiment.

Subsequently, a method for decoding encoded data generated by an apparatus of the embodiments will be described with reference to FIG. 6. FIG. 6 is a block diagram showing the configuration of a moving image decoding apparatus according to this embodiment.

In FIG. 6, the moving image decoding apparatus is provided with a frame memory 600, an entropy decoder 601, an inverse quantizer 602, an inverse orthogonal transforming unit 603, an intra prediction unit 604, a motion compensating unit 605, an intra/inter selecting unit 606, an adder 607, a deblocking filter 608 and an array transforming unit 609.

The frame memory 600 stores encoded data. Note that the encoded data is assumed to have been generated from the entropy encoder 109 of the image encoding apparatus of the above embodiment, but the encoded data may be stored on a storage medium or downloaded from a network, and the type thereof is not restricted.

The entropy decoder 601 reads out encoded data from the frame memory 600, and decodes the data that underwent entropy encoding using CAVLC, CABAC or the like. If the decoded data is data that has been encoded with an orthogonal transformation coefficient, the orthogonal transformation coefficient is transmitted to the inverse quantizer 602, if the decoded data is data that has been encoded with an intra prediction mode, the intra prediction mode is transmitted to the intra prediction unit 604, and if the decoded data is data that has been encoded with motion vector information (including c_v_vec align), the motion vector information is transmitted to the motion compensating unit 605. In addition, information regarding whether the selected prediction mode is based on a motion vector or is intra prediction is transmitted to the intra/inter selecting unit 606.

The inverse quantizer 602 performs inverse quantization on the transformation coefficient that has been input, and transmits the transformation coefficient to the inverse orthogonal transforming unit 603. The inverse orthogonal transforming unit 603 performs inverse orthogonal transformation processing on the signals that underwent inverse quantization, and transmits the signals to the adder 607. The intra prediction unit 604 reads out necessary image data from the frame memory 600 in accordance with the intra prediction mode that has been input, and generates blocks of an intra prediction image.

The motion compensating unit 605 reads out decoded image data held in the frame memory 600, using the motion vector information that has been input, and generates blocks of a G plane of an inter prediction image. Note that a detailed procedure of a method for reconfiguring the vertical component of the motion vector of R and B planes, the method being a feature of the embodiments, will be described later.

If the decoded data is data that has been encoded using motion vector information, the intra/inter prediction selecting unit 606 transmits block data that is output from the motion compensating unit 605, as a prediction image block to the adder 607. Also, if the decoded data is data that has been encoded using intra prediction, the intra/inter prediction selecting unit 606 transmits block data that is output from the intra prediction unit 604 to the adder 607 as a prediction image block.

The adder 607 adds together the prediction image block from the intra/inter prediction selecting unit 606 and difference information of a pixel block transmitted from the inverse orthogonal transforming unit 603, reconfigures an image block (macroblock) to be decoded, and transmits the image block to the deblocking filter 608. The deblocking filter 608 performs filtering processing for reducing coding distortion on the reconfigured image data, and stores the image data to the frame memory 600. The deblocking filter 608 also transmits the image data to the array transforming unit 609. The array transforming unit 609 reorders the image data of G0, G1, R and B that have been reconfigured into a YCC 422 array back into a Bayer array, and stores the image data as RAW image data to the frame memory 600.

Figure 7:
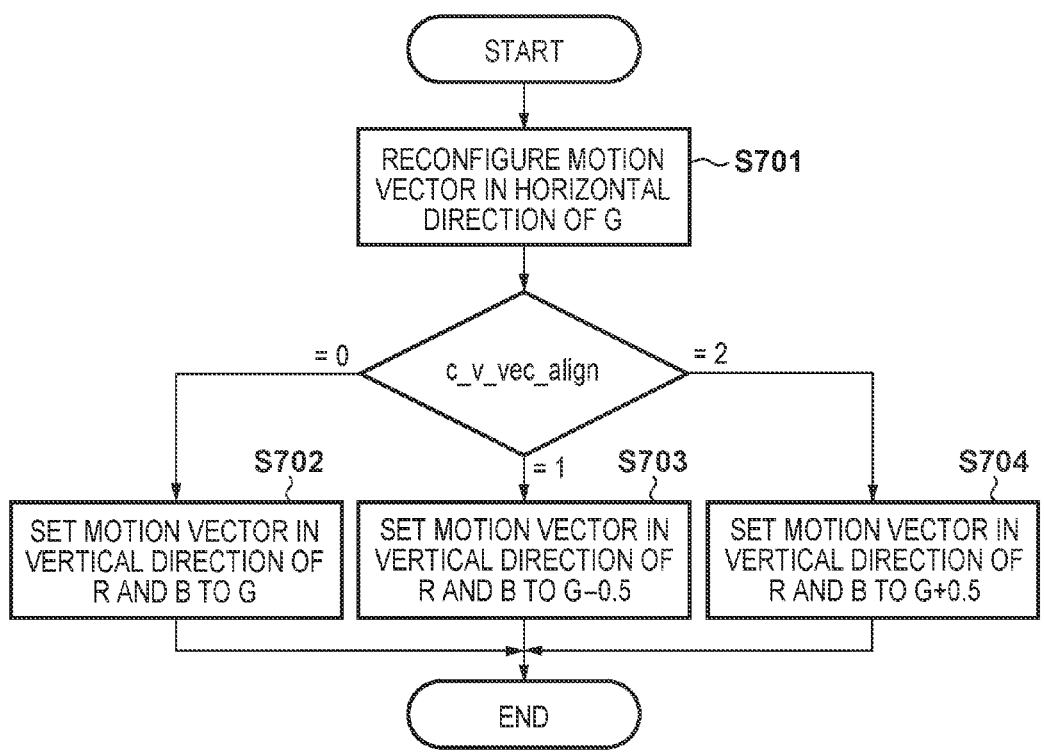
FIG. 7 is a flowchart showing reconfiguration of the vertical component of a motion vector of R and B planes at the time of decoding.

Next, a method for reconfiguring the vertical component of the motion vector of R and B planes from c_v_vec_align and motion vector information will be described with reference to the flowchart in FIG. 7. Note that a method for reconfiguring the horizontal component of the motion vector of the R and B planes is not different from the cases of H.264 and MPEG, and thus description thereof is omitted, and the method for reconfiguring the vertical component of the motion vector of R and B planes will be described below.

In the case of motion vector information and H.264, the motion compensating unit 605 reconfigures the horizontal component of a motion vector of a G plane from a mvd_l0 or a mvd_l1 vertical component and motion vectors of peripheral blocks (step S701).

Subsequently, the motion compensating unit 605 reconfigures the vertical component of the motion vector of the R and B planes according to cases as follows based on the value of c_v_vec_align obtained by performing decoding.

In the case of c_v_vec_align =0, the vertical component of the motion vector of the R and B planes is determined to be the same as the vertical component of the motion vector of the G plane (step S702).

In the case of c_v_vec_align =1, the vertical component of the motion vector of the R and B planes is determined to be a value obtained by correcting the vertical component of the motion vector of the G plane with −0.5 (upward direction) (step S703).

In the case of c_v_vec_align =2, the vertical component of the motion vector of the R and B planes is determined to be a value obtained by correcting the vertical component of the motion vector of the G plane with +0.5 (downward direction) (step S704).

By adding c_v_vec_align to an encoding parameter at the time of encoding in this manner, it becomes possible to reconfigure the vertical component of the motion vector of the R and B planes at the time of decoding.

Note that in this embodiment, if the horizontal component of the motion vector of the G plane is an even number with integer precision, encoding is performed assuming that c_v_vec_align is 0, but a configuration may be adopted in which c_v_vec_align is not encoded, or any value that makes it possible to distinguish between 0.5 and −0.5 is added to c_v_vec_align.

Figure 8:
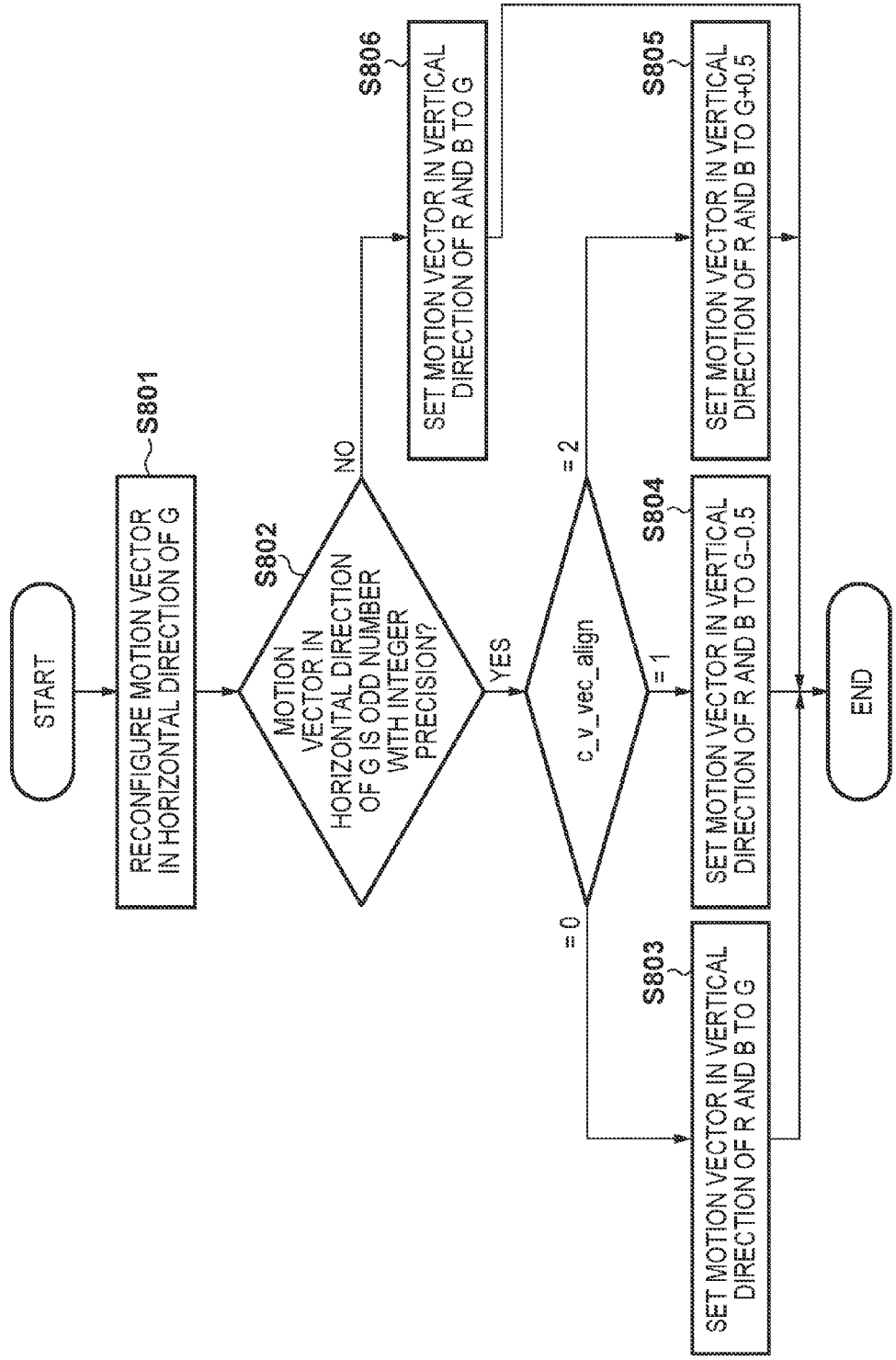
FIG. 8 is another flowchart showing reconfiguration of the vertical component of a motion vector of R and B planes at the time of decoding.

A method for reconfiguring the vertical component of the motion vector of the R and B planes in this case will be described with reference to the flowchart in FIG. 8.

In the case of motion vector information and H.264, the motion compensating unit 605 reconfigures the horizontal component of the motion vector of the G plane from mvd_l0 or mvd_l1 vertical component and motion vectors of peripheral blocks (step S801). The motion compensating unit 605 then determines whether or not the horizontal component of the motion vector of the G plane is an odd number with integer precision (step S802). In the case of an odd number, processing for reconfiguring the vertical component of the motion vector of the R and B planes (correction processing) is executed according to the cases as follows.

In the case of c_v_vec_align =0, the vertical component of the motion vector of the R and B planes is determined to be the same as the vertical component of the motion vector of the G plane (step S803).

In the case of c_v_vec_align =1, the vertical component of the motion vector of the R and B planes is determined to be a value obtained by correcting the vertical component of the motion vector of the G plane with −0.5 (upward direction) (step S804).

In the case of c_v_vec_align =2, the vertical component of the motion vector of the R and B planes is determined to be a value obtained by correcting the vertical component of the motion vector of the G plane with +0.5 (downward direction) (step S805).

In the case where the horizontal component of the motion vector of the G plane is an even number with integer precision, the vertical component of the motion vector of the R and B planes is determined to be the same as the vertical component of the motion vector of the G plane (step S806).

The above description is summarized as follows.

(1) In the case where a motion vector for a macroblock (pixel block) to be encoded in a G plane is obtained, the horizontal component of the motion vector of R and B planes is determined as half that of the G plane.

(2) The vertical component of the motion vector of the R and B planes is determined in the following manner.

(2-1) In the case where the horizontal component of the motion vector of the G plane is an even number, the vertical component of the motion vector of the R and B planes is presumed to be the same as the vertical component of the motion vector of the G plane.

(2-2) In the case where the horizontal component of the motion vector of the G plane is an odd number:

G0_MAE indicating an index value of the magnitude of the difference between an image constituted by pixels G0 in a Bayer array within the pixel block to be encoded and an image of a reference block indicated by the motion vector is compared with G1_MAE indicating an index value of the magnitude of the difference between an image constituted by pixels G1 in a Bayer array within the pixel block to be encoded and the image of the reference block indicated by the motion vector, using a positive threshold value Th.

In the case of "G0_MAE>G1_MAE+Th", a correction value "+0.5" is added to the vertical component of the motion vector of the G plane.

In the case of "absolute value of difference G0_MAE− G1_MAE≤Th", the vertical component of the motion vector of the R and B planes is determined to be the same as the vertical component of the motion vector of the G plane (a correction value "0" is added).

In the case of "G0_MAE+Th<G1_MAE", a correction value "−0.5" is added to (0.5 is subtracted from) the vertical component of the motion vector of the G plane.

As a result of the above-described processing, the motion vector of the B plane and R plane is corrected based on the motion vector of the G plane, and it is possible to improve the encoding efficiency of RAW image data in a Bayer array.

Second Embodiment

An encoding method in an image encoding apparatus that is a second embodiment will be described. FIG. 9 is a block diagram showing the configuration of the image encoding apparatus in the second embodiment. This figure is similar to FIG. 1 of the first embodiment, but a vector information collecting unit 900 is added. The second embodiment is different from the first embodiment in that this vector information collecting unit 900 collects G0_MAE and G1_MAE from a motion searching unit 102, and sets c_v_vec_align not in units of blocks but in units of pictures.

Note that, in FIG. 9, processing other than processing of the motion searching unit 102, a prediction image generator 105 and the vector information collecting unit 900 is similar to the first embodiment, and thus description thereof is omitted.

The motion searching unit 102 reads out image data of a macroblock to be encoded from a frame memory 101. The motion searching unit 102 also reads out image data of a predetermined search window from the region of reference image data, performs motion search similarly to the first embodiment, and determines a motion vector of a G plane. The motion searching unit 102 also notifies an intra/inter determiner 104 of the MAE value of the image data of the current macroblock at the position of the motion vector and the pixels of the reference image data. After the motion vector of the G plane is determined, the motion searching unit 102 determines whether or not the horizontal component of the motion vector of the G plane is an odd number with integer precision, in other words, the motion vector is a motion vector in which G0 and G1 refer to each other. Here, if the horizontal component of the motion vector of the G plane is an odd number with integer precision, the motion searching unit 102 determines whether to determine the motion vector of the R and B planes to be the same as that of the G plane, to correct the motion vector of the R and B planes with −0.5, or to correct the motion vector of the R and B planes with +0.5, by a method similar to that of the first embodiment. The motion searching unit 102 then transmits the determination content as vector correction information to the vector information collecting unit 900.

The vector information collecting unit 900 collects vector correction information of macroblocks in the R and B planes for one frame (picture) from the motion searching unit 102. The vector information collecting unit 900 then totals the number of blocks when the motion vector of the R and B planes is determined to be the same as that of G plane, the number of blocks when the motion vector of G plane is corrected with −0.5, and the number of blocks when the motion vector of the G plane is corrected with +0.5, adopts the greatest number of blocks as c_v_vec_align, and transmits c_v_vec_align to the prediction image generator 105. Here, the number of blocks when the motion vector of the R and B planes is determined to be the same as that of G plane is assumed to be the total of the number of blocks in the case where the procedure advanced to steps S506, S509, S513 and S516 in FIGS. 5A and 5B and the number of block in the case where the procedure advanced to step S501.

An intra prediction unit 103 reads out the image data of a block to be encoded from the region of an input image in the frame memory 101, selects an intra prediction method based on the correlation with a plurality of pieces of intra prediction image data generated from pixel data in the periphery of the encoding target block that has been encoded already, and notifies the intra/inter determiner 104 of the selected intra prediction method. The intra prediction unit 103 also notifies the intra/inter determiner 104 of the MAE value of the pixels of a prediction image obtained using the selected intra prediction method and the macroblock to be encoded.

The intra/inter determiner 104 receives input of the MAE value from the motion searching unit 102 and the MAE value from the intra prediction unit 103, selects a prediction method of the smaller of the input MAEs, and notifies the prediction image generator 105 of the selected prediction method.

The prediction image generator 105 holds the intra/inter determination result, a motion vector and an intra prediction mode for one picture, and generates a prediction image in accordance with the intra prediction mode selected for each block. When such information for one picture is collected, if the selected prediction method is inter prediction for each block, the prediction image generator 105 generates a prediction image in accordance with the motion vector and c_v_vec_align determined by the vector information collecting unit 900, and outputs the prediction image to a subtractor 106. The prediction image generator 105 also transmits the selected motion vector or intra prediction mode to an entropy encoder 109. Processing onward is similar to the first embodiment, and thus description thereof is omitted.

As a result of the above, in the second embodiment, actual encoding is performed after vector correction information is collected for all the blocks of the picture of interest, requiring a time delay of one frame between searching for a motion vector and encoding, and thus the frame memory 101 requires a capacity larger than that of the first embodiment by at least one frame. However, processing for collecting vector information and encoding processing can be achieved by pipeline processing.

As described above, unlike the first embodiment, by setting one c_v_vec_align for one picture, the accuracy of a motion vector for each block deteriorates, but the number of c_v_vec_align that need to be encoded can be reduced to one from the number of blocks corresponding to one picture. Note that, in the second embodiment, c_v_vec_align is calculated in units of pictures, but c_v_vec_align may be calculated in units of slices, since it suffices that a plurality of macroblocks are included. In that case, is suffices for the vector information collecting unit to change a unit for collecting correction vector information from pictures to slices.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-162206, filed Aug. 22, 2016 which is hereby incorporated by reference herein in its entirety.

What is claimed is:

1. An image encoding apparatus that encodes moving image data in which each frame is constituted by image data in a Bayer array, comprising:
   a converting unit configured to convert image data in a Bayer array into three planes consisting of a G plane, a B plane, and an R plane, the number of pixels in a horizontal direction of the G plane being twice the number of pixels in the horizontal direction of the B plane or R plane; and
   an encoding unit configured to perform prediction encoding, for each pixel block, with the G plane, B plane, and R plane obtained by the converting unit as YCC 422 image data,
   wherein the encoding unit includes:
   (a) a motion searching unit configured to obtain a motion vector of the pixel block to be encoded, as a motion vector of the G plane; and
   (b) a correcting unit configured to correct a motion vector of the B and R planes based on the motion vector obtained by the motion searching unit, and
   wherein the correcting unit:
   (1) determines a horizontal component of the motion vector of the R plane and the B plane to be half of a horizontal component of the motion vector of image data of the G plane, and
   (2) with regard to a vertical component of the motion vector of the R plane and the B plane,
   (2-1) if the horizontal component of the motion vector of the G plane is an even number with integer precision, takes the vertical component of the motion vector of the R plane and the B plane to be the same as a vertical component of the motion vector of the G plane, and
   (2-2) if the horizontal component of the motion vector of the G plane is an odd number with integer precision, determines one of "+0.5", "0" and "−0.5" as a correction value that is based on the vertical component of the motion vector of the G plane.

2. The apparatus according to claim 1, wherein the correcting unit:
   (1) determines the horizontal component of the motion vector of the R plane and the B plane to be half of the horizontal component of the motion vector of the image data of the G plane, and
   (2) with regard to the vertical component of the motion vector of the R plane and the B plane,
   (2-1) if the horizontal component of the motion vector of the G plane is an even number with integer precision, takes the vertical component of the motion vector of the R plane and the B plane to be the same as the vertical component of the motion vector of the G plane, and
   (2-2) if the horizontal component of the motion vector of the G plane is an odd number with integer precision, compares a first value serving as an index value representing a magnitude of a difference between an image constituted by pixels G0 in a Bayer array within a pixel block to be encoded and an image of a reference block indicated by the motion vector with a second value serving as an index value representing a magnitude of a difference between an image constituted by pixels G1 in a Bayer array within the pixel block to be encoded and the image of the reference block indicated by the motion vector, and determines one of "+0.5", "0" and "−0.5" as a correction value that is based on the vertical component of the motion vector of the G plane according to the comparison.

3. The apparatus according to claim 2, wherein the correcting unit:
- in a case where the first value is greater than the second value by a predetermined threshold value Th, determines "+0.5" as the correction value for the vertical component of the motion vector of the R plane and the B plane,
- in a case where an absolute value of a difference between the first value and the second value is less than or equal to the threshold value Th, determines "0" as the correction value, and
- in a case where the second value is greater than the first value by the threshold value Th set in advance, determines "−0.5" as the correction value for the vertical component of the motion vector of the R plane and the B plane.

4. The apparatus according to claim 1, wherein the correcting unit:
- for each pixel block in a region that includes a plurality of the pixel blocks,
  - (1) determines the horizontal component of the motion vector of the R plane and the B plane to be half of the horizontal component of the motion vector of the G plane,
  - (2) determines the vertical component of the motion vector for each pixel block of the R plane and the B plane to be a value obtained by correcting the vertical component of the motion vector of the G plane by one of correction values "+0.5", "0", and "−0.5", based on a result of totaling:
    - (2-1) the number of pixel blocks in a case where the horizontal component of the motion vector of the G plane is an even number with integer precision,
    - (2-2) the number of pixel blocks at which a first value >a second value +Th,
    - (2-3) the number of pixel blocks at which the first value +Th < the second value, and
    - (2-4) the number of pixel blocks at which an absolute value of the difference between the first value and the second value ≤ Th,
  - when, in a case where the horizontal component of the motion vector of the G plane is an odd number with integer precision, the first value serving as an index value representing a magnitude of a difference between an image constituted by pixels G0 in a Bayer array within a pixel block to be encoded and an image of a reference block indicated by the motion vector and the second value serving as an index value representing a magnitude of a difference between an image constituted by pixels G1 in a Bayer array within the pixel block to be encoded and the image of the reference block indicated by the motion vector are compared using a predetermined threshold value Th.

5. The apparatus according to claim 4, wherein the correcting unit:
- in a case where a total of the number of blocks indicated by the (2-1) and the number of blocks indicated by the (2-4) is greater than the other numbers of blocks, determines "0" as the correction value,
- in a case where the number of blocks indicated by the (2-2) is greater than the other numbers of blocks, determines "+0.5" as the correction value, and
- in a case where the number of blocks indicated by the (2-3) is greater than the other numbers of blocks, determines "−0.5" as the correction value.

6. The apparatus according to claim 4, wherein the region includes a frame or a slice.

7. The apparatus according to claim 2, wherein the correcting unit obtains one of an MSE (Mean Square Error), an MAE (Mean Absolute Error), and an MAD (Mean Absolute Difference) as the index value.

8. The apparatus according to claim 1, further comprising:
- an imaging unit configured to capture an image, and to generate the captured image as moving image data in a Bayer array.

9. A control method of an image encoding apparatus that encodes moving image data in which each frame is constituted by image data in a Bayer array, the method comprising:
- converting image data in a Bayer array into three planes consisting of a G plane, a B plane, and an R plane, the number of pixels in a horizontal direction of the G plane being twice the number of pixels in the horizontal direction of the B plane or R plane; and
- performing prediction encoding, for each pixel block, with the G plane, B plane, and R plane obtained in the converting as YCC 422 image data,
- wherein in the prediction encoding,
  - (a) a motion vector of the pixel block to be encoded is obtained as a motion vector of the G plane, and
  - (b) a motion vector of the B and R planes is corrected based on the obtained motion vector, and
- wherein the correction:
  - (1) determines a horizontal component of the motion vector of the R plane and the B plane to be half of a horizontal component of the motion vector of image data of the G plane, and
  - (2) with regard to a vertical component of the motion vector of the R plane and the B plane,
    - (2-1) if the horizontal component of the motion vector of the G plane is an even number with integer precision, takes the vertical component of the motion vector of the R plane and the B plane to be the same as a vertical component of the motion vector of the G plane, and
    - (2-2) if the horizontal component of the motion vector of the G plane is an odd number with integer precision, determines one of "+0.5", "0" and "−0.5" as a correction value that is based on the vertical component of the motion vector of the G plane.

10. A non-transitory computer-readable storage medium storing a program which causes, when read and executed by a computer, the computer to execute steps of a control method of an image encoding apparatus that encodes moving image data in which each frame is constituted by image data in a Bayer array, the method comprising:
- converting image data in a Bayer array into three planes consisting of a G plane, a B plane, and an R plane, the number of pixels in a horizontal direction of the G plane being twice the number of pixels in the horizontal direction of the B plane or R plane; and
- performing prediction encoding, for each pixel block, with the G plane, B plane, and R plane obtained in the converting as YCC 422 image data,
- wherein in the prediction encoding,
  - (a) a motion vector of the pixel block to be encoded is obtained as a motion vector of the G plane, and
  - (b) a motion vector of the B and R planes is corrected based on the obtained motion vector, and
- wherein the correction:
  - (1) determines a horizontal component of the motion vector of the R plane and the B plane to be half of a horizontal component of the motion vector of image data of the G plane, and
  - (2) with regard to a vertical component of the motion vector of the R plane and the B plane, (2-1) if the horizontal component of the motion vector of the G plane is an even number with integer precision, takes the vertical component of the motion vector of the R plane and the B plane to be the same as a vertical component of the motion vector of the G plane, and
(2-2) if the horizontal component of the motion vector of the G plane is an odd number with integer precision, determines one of "+0.5", "0" and "−0.5" as a correction value that is based on the vertical component of the motion vector of the G plane.

* * * * *